3,013,214
MICROWAVE MASER AMPLIFIER
Richard W. Damon, Schenectady, N.Y., assignor to General Electric Company, a corporation of New York
Filed Dec. 27, 1957, Ser. No. 705,672
3 Claims. (Cl. 330—4)

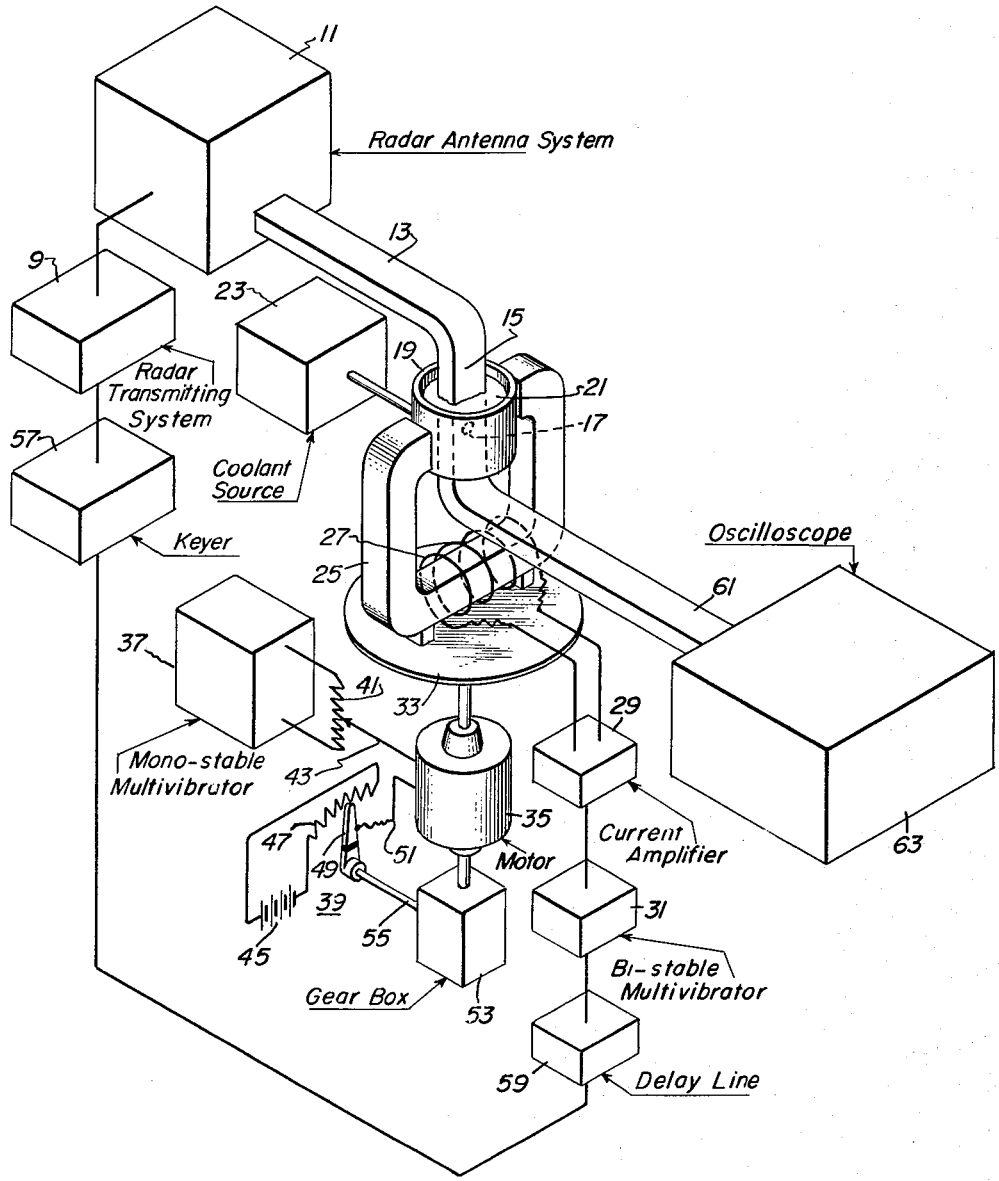

The present invention relates to an improved microwave amplifier and more particularly to an improved microwave amplifier utilizing improved paramagnetic materials.

Recent developments in atomic physics have produced an entirely new type of high frequency amplifier, called a "maser," which holds promise of great gains in the range and performance of radar, electronic counter measures and scatter communication systems. The term "maser" is an acronym derived from the principle of operation, i.e., microwave amplification by stimulated emission of radiation. More specifically, in operation of the maser a small crystal of paramagnetic material is mounted in a microwave cavity and exposed to orthogonally arranged magnetic fields from a direct polarizing magnet and a source of microwave energy.

The operation of a maser is based upon the spin of electrons about their own axes, which spin, being equivalent to a moving charge, produces a magnetic field that is similar to the magnetic field produced by a dipole magnet. Because it is a spinning particle the electron also behaves in a gyroscopic manner which with the dipole magnet effect produces a result similar to that obtainable by mounting a dipole magnet with its polar axis aligned with that of the rotating element of a gyroscope. For this reason the spinning electrons are referred to as gyromagnets in the following discussion.

The direct magnetic field in which the maser material is immersed, causes the gyromagnets eventually to line up with the field so that the south poles of the gyromagnets are closest to the north pole of the magnet producing the direct magnetic field. With the gyromagnets in these positions, the maser material is said to be in thermal equilibrium, for the gyromagnets then have their lowest state of energy and tend to remain in these positions until energy is applied to them. For short periods of time these gyromagnets can be energized to be opposed to the magnetic field so that the north poles of the gyromagnets are adjacent to the north pole of the direct magnet. This is the highest state of energy for then the gyromagnets can release energy during thermalization, the term applied to movement from a position of high energy to that of thermal equilibrium. In moving, the gyromagnets precess much like a gyroscope precesses with the exception that the frequency of precession, which is called the resonant frequency, is a function of the applied direct magnetic field rather than of the force of gravity. The release of energy during movement is mostly in the form of heat unless the maser material is subjected to a microwave magnetic field directed at right angles to the direct magnetic field. In this case, if the frequency of the source of microwave energy is equal to the resonant frequency of the gyromagnets, these gyromagnets release energy to the microwave field during their movements from their high energy positions to their low energy positions. Since the energy released in allowed transitions is quantized, the individual gyromagnets in making a transition between one level and a lower one, yield their total stored energy. Under stimulation, the gyromagnets do not make the transitions simultaneously, but the numbers of them making a transition, when plotted against time, follow an exponentially decaying curve. Considering the gyromagnets in the aggregate, or in other words, on a statistical basis they release energy to the system from condition wherein all are in higher energy positions to that in which substantially one-half of them have made a transition to the lower energy position or in other words, to the midpoint of the total energy transfer. In a lossless system, which is of course unobtainable, the maser material releases energy to the microwave field for the time required for one half of gyromagnets to move between the two energy levels. But the released energy diminishes rapidly as the midpoint is approached and is down several decibels when 1/e or approximately 37% of the gyromagnets have moved to thermal equilibrium. In a practical system with losses, the useful gain is limited approximately to the time that it takes 1/e of the gyromagnets to move between energy levels, which time is termed the relaxation time.

For amplification and substantially constant gain it is obviously desirable to have a maser material with a long relaxation time. However, since relaxation time is a function of the thermalization time, a long relaxation time means a long thermalization time. Consequently, past maser materials with long relaxation times could not be used to produce amplification at a very rapid periodic rate. To explain this further, if a maser material has a long relaxation time, the time required for the gyromagnets to pass through the portion of the thermalization cycle from the end of the relaxation time to thermal equilibrium is also very long. For effective maser operation, when the gyromagnets reach thermal equilibrium, and only then, can they be quickly inverted to their high energy level by reversal of the direct magnetic field or by energizing the maser material with a varying direct magnetic field or by some other suitable method. If the gyromagnets are inverted at any other time, they do not all go to their high energy level position, but rather only those having made a transition do so. Those not having made a transition are inverted to a position that in the changed magnetic field, is a low energy position. While it would be advantageous to have a maser material in which the relaxation time is quite long as compared to the thermalization time required to go to thermal equilibrium after the relaxation time, up to the present there have been no maser materials suitable for two energy level type masers.

Accordingly, an object of the present invention is to provide an improved two level maser.

Another object is to provide an improved maser material.

A further object is to provide a maser material that has a long relaxation time as compared with the remainder of the time required for the thermalization cycle.

A still further object of the present invention is to provide a two level maser having substantially constant gain.

These and other objects are achieved in one form of my invention by the utilization in a maser of a paramagnetic crystal material having isotropic and anisotropic ions, the former of which have a long relaxation time and the latter of which have a comparatively short relaxation time. A direct magnetic field is provided by a rotatable direct magnet which at the end of the relaxation time for the isotropic ions is rotated to such an angle with respect to the crystal axis that the resonant frequencies of the two types of ions are the same with the result that the anisotropic ions remove energy from the isotropic ions thereby bringing them quickly to thermal equilibrium. The direct magnetic field is then returned to its original position to render the resonant frequencies different. Subsequently, the isotropic ions are inverted by any one of several means to bring the isotropic ions again to their high energy level position, after which the amplification process may be repeated.

The novel features that I believe are characteristic of my invention are set forth in the appended claims. My invention itself, however, together with further objects and advantages thereof may best be understood by reference to the following description taken in connection with the accompanying drawing, in which the single FIGURE illustrates a block diagram of a preferred embodiment of my invention.

In this figure I have illustrated a radar system that includes a radar transmitting system 9 for energizing a radar antenna system 11 that in turn radiates a radar signal which is reflected from an object (not shown) such as an airplane or rocket and returned in part to antenna system 11. From antenna system 11 the received signal is transmitted along a horizontal section of waveguide 13 to a vertical section 15 in which a single crystal of maser material 17 is mounted. This material includes isotropic and anisotropic paramagnetic ions, the former having a long relaxation time as compared to that of the latter. Isotropic ions are characterized by a resonant frequency that is independent of the direction of an applied direct magnetic field while anisotropic ions have a resonant frequency that is a function of the direction of a direct magnetic field with respect to the crystal axis of the material of which these ions are a part. As will be seen later, for operation of the present invention, one of the resonant frequencies of the anisotropic ions must be the same as that of the isotropic ions for certain angles between the crystal axis and the direct magnetic field. Suitable isotropic materials include some salts containing gadolinium, or europium of the rare earth series, and nickel, chromium, vanadium and titanium, also double valent manganese ions or triple valent ferric ions except in cyanide complex compounds. Suitable anisotropic materials include cobalt, copper, all of the rare earth elements except gadolinium or europium, and manganese and iron atoms in cyanide complex compounds. There are many other suitable materials all of which are well known to those skilled in the art. The paramagnetic ions are mixed in a nonparamagnetic material in small portions of the order of 1% each, the exact proportions being formed empirically at the present date, but which are known to be dependent upon the resonant frequencies desired, the gain, etc. One suitable maser material comprises 98% of a magnesium sulphate host crystal with 1% of an isotropic material of $MnSO_4 \cdot 7H_2O$ and 1% of an anisotropic material of $CoSO_4 \cdot 7H_2O$.

The net magnetization or number of gyromagnets and the relaxation time of known maser materials are dependent upon temperature such that the higher the temperature of the material the shorter the relaxation time and the smaller the magnetization. At normal temperatures the relaxation times are quite fast and the magnetization small, leading to low amplification gain and short amplification times. For the amplification required in present day radar systems, the maser material 17 must be cooled with a low temperature coolant such as liquid nitrogen or helium, which may be contained in a cryostat 19, as shown, that is supplied with coolant by a source 23 at a rate just sufficient to maintain a fairly constant level of the liquid coolant as it evaporates.

The maser material 17 is subjected to a direct magnetic field from an electromagnet 25 having windings 27 that are energized from a current amplifier 29 and a bistable multivibrator 31. The position of magnet 25 with respect to vertical section waveguide 15 is such that the direct magnetic field is at a right angle with respect to the microwave magnetic energy from waveguide 15 impinging the material 17. The bistable multivibrator 31 alternately produces direct currents of opposite polarities that are amplified in current amplifier 29 to cause a reversal of the poles of magnet 25 whenever this multivibrator is triggered by a pulse.

Means are provided for imparting periodic angular movement to magnet 25 which means comprises a turn table 33 that is driven by an electric motor 35 which in turn is controlled by a control system comprising a monostable multivibrator 37 and a potentiometer arrangement 39. The output voltage from multivibrator 37 is developed across a tapped resistor 41, the tapped voltage from which is conducted by lead 43 to an input terminal of motor 35. Potentiometer arrangement 39 comprises a source of direct voltage 45 connected in series with a potentiometer wire 47 across which a movable arm 49 taps off a portion of the voltage, which voltage portion is conducted by lead 51 to the other input terminal of motor 35. When there is a difference of potential on leads 43 and 51, motor 35 drives arm 49 through a gear box 53 and rod 55 until the voltage tapped off by arm 49 is equal to the voltage on lead 43. Then there is no voltage across the input terminals 35, the motor is deenergized and thus ceases to rotate table 33. Consequently, the output voltage across resistor 41 determines the shaft position of motor 35 and hence the position of table 33. Table 33 has two positions corresponding to the two voltages generated by multivibrator 37 for when one of these voltages is generated, motor 35 rotates table 33 to one position and when the other voltage is generated the table 33 is rotated to another position. The two positions of table 33 and thus of magnet 25 are such that in one position, which I shall call the amplification position, the direct field from magnet 25 causes the resonant frequencies of the two types of ions in material 17 to be different and in the other position, which I shall call the thermalization position, causes these two resonant frequencies to be the same. The keying pulses for multivibrator 31 and 37 are provided by a keyer 57 that suitably shapes pulses from system 9, received simultaneously with the transmission of radar pulses, for triggering multivibrator 37 instantaneously and multivibrator 31 at a short time later determined by a delay line 59.

The amplified signal from the maser material 17 is transmitted through a horizontal waveguide section 61 to a utilizing component such as an oscilloscope 63 wherein the amplified radar pulses may be visibly detected.

In regards to the operation of the system as a whole, when a pulse is transmitted from system 9 a pulse is also conducted to keyer 57, which suitably shapes this pulse for triggering multivibrators 37 and 31. The triggering of multivibrator 37 causes it to revert to its non-stable state in which it produces a voltage that through potentiometer arrangement 39 and motor 35 causes magnet 25 to be moved to its amplification position. The pulse applied to multivibrator 31 is delayed by delay line 59 a sufficient time to permit this movement before it triggers multivibrator 31. Upon being triggered, multivibrator 31 reverses the current in windings 27 and thus also the poles of the magnet 25 which in turn inverts the isotropic ions, which were in thermal equilibrium immediately before the reversal of the poles, to their highest energy level.

When a radar pulse is received by antenna system 11, it is guided by waveguide sections 13 and 15 to maser material 17 which amplifies the pulse before it is transmitted by waveguide 61 to oscilloscope 41. The time constant of multivibrator 37 is such that at approximately the end of the relaxation time of the isotropic ions, the multivibrator reverts to its stable state thereby changing the voltage across resistor 41 and thus causing motor 35 to rotate magnet 25 to its thermalization position. In this position the angle between the direct field 25 and the axis of the crystal of material 17 is such that the resonant frequency of the anisotropic ions is equal to that of the isotropic ions. Then the anisotropic ions, which have a much shorter thermalization time than the isotropic ions, absorb energy from the isotropic ions thereby bringing them to thermal equilibrium much quicker than if there had been no anisotropic ions. When the next radar pulse is transmitted the whole process is repeated.

From the above it is evident that the isotropic ions come to thermal equilibirum when magnet 25 is in its thermalization position. Then when magnet 25 is moved to its amplification position, the isotropic ions remain in thermal equilibrium and the magnetization follows the field in its rotation provided the field rotation occurs at a rate which is slow compared to the precession rate of the magnetization. Since this latter rate is essentially the signal frequency, and thus hundreds or thousands of megacycles per second, magnet rotation rates almost inevitably satisfy this condition.

Although the present invention has been described in reference to the amplification of radar pulses it should be apparent that it is suitable for the amplification of nearly all types of pulses, regardless of their source. Further, although the inversion of the gyromagnets is shown to be accomplished by inverting the poles of magnet 25, it should be apparent that there are other suitable means for inverting the gyromagnets including the use of a varying direct magnetic field or a strong pulse of high frequency energy of suitable amplitude and duration. Also, although the change in direction of magnetic field with respect to the crystal axis of material 17 is accomplished by rotating magnet 25, it could as well be done by rotating the material 17 while maintaining magnet 25 fixed. Or two magnets could be placed at different angles with respect to material 17 and alternately energized.

Thus, it is seen that a two energy level type maser has been provided that has a long period of amplification with respect to the non-amplification period. This is accomplished by using two types of paramagnetic ions in the maser material one of which has a much longer relaxation time than the other. If the period of the application of the pulse is short as compared to the long relaxation time, substantially constant gain is had because the gain of the maser material changes slowly.

Although I have described my invention with respect to a certain specific embodiment, it will be appreciated that many modifications and changes may be made by those skilled in the art without departing from the spirit of the invention. I intend, therefore, by the appended claims, to cover all such modifications and changes as fall within the true spirit and scope of my invention.

What I claim as new and desire to secure by Letters Patent of the United States is:

1. A maser for producing amplification of an input microwave signal comprising a maser material including paramagnetic isotropic ions and anisotropic ions having a short relaxation time as compared with the relaxation time of said isotropic ions and having one resonant frequency that is the same as the resonant frequency of said isotropic ions, means for immersing said maser material in a direct magnetic field, means for causing said anisotropic ions to have a resonant frequency different from said isotropic ions during an amplification period means for causing said anisotropic ions to have the same resonant frequency as said isotropic ions after an amplification period of the maser to bring the isotropic ions into thermal equilibrium, and means for inverting said isotropic ions after they are in thermal equilibrium.

2. A maser for producing amplification of an input microwave signal comprising a maser material including paramagnetic isotropic ions and anisotropic ions having a short relaxation time as compared with the relaxation time of said isotropic ions and having one resonant frequency for a predetermined orientation of the maser material in a direct magnetic field that is the same as the resonant frequency of said isotropic ions, means for immersing said maser material in a direct magnetic field at an orientaiton remote from said predetermined orientation, means for producing angular movement between said material and said direct magnetic field to said predetermined orientation at the end of an amplification period of the maser to cause said anisotropic ions to have the same resonant frequency as said isotropic ions and thereby bring the isotropic ions into thermal equilibrium, and means for inverting said isotropic ions after they are in thermal equilibrium.

3. A maser for producing amplification of an input microwave signal comprising a maser material having an axis and including paramagnetic isotropic ions and anisotropic ions having a short relaxation time as compared with the relaxation time of said isotropic ions and having one resonant frequency for a predetermined orientation of the axis and said maser material in a direct magnetic field that is the same as the resonant frequency of said isotropic ions, means for immersing said maser material in a direct magnetic field at an orientation remote from said predetermined orientation, means for rotating the magnetic field after an amplification period of the maser to a position with the axis of the maser material to said predetermined orientation such that the resonant frequency of said anisotropic ions is the same as the resonant frequency of the isotropic ions, whereby the isotropic ions are brought quickly to thermal equilibrium, means for rotating the direct magnetic field after the isotropic ions have been brought into thermal equilibrium to a position with the axis of the maser material such that the resonant frequency of the anisotropic ions is different from that of the isotropic ions, and means for reversing the polarity of the direct magnetic field after the isotropic ions are in thermal equilibrium.

References Cited in the file of this patent

UNITED STATES PATENTS

| | | |
|---|---|---|
| 2,762,871 | Dicke | Sept. 11, 1956 |
| 2,802,944 | Norton | Aug. 13, 1957 |
| 2,879,439 | Townes | Mar. 24, 1959 |
| 2,883,481 | Tien | Apr. 21, 1959 |
| 2,883,629 | Suhl | Apr. 21, 1959 |

OTHER REFERENCES

Feheret et al.: Physical Review, vol. 105, No. 2, January 1957, pages 760–763.

"Journal of Applied Physics," April 1957, page 511.

Wittke: "Proceedings of the IRE," March 1957, pages 291–316.

Artman: "Proceedings of the IRE," October 1956, pages 1284–1293.

"Spectroscopy at Radio and Microwave Frequencies," by Igram (1955), published by Butterworth's Scientific Publications (London). (Page 215 relied on.)